United States Patent
Kubota et al.

(10) Patent No.: US 7,007,994 B2
(45) Date of Patent: Mar. 7, 2006

(54) CENTER CONSOLE

(75) Inventors: Norio Kubota, Shioya-gun (JP); Rikiya Oyama, Tokorozawa (JP); Hiroshi Sato, Utsunomiya (JP)

(73) Assignees: TS Tech Co., Ltd., Asaka (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/938,736

(22) Filed: Sep. 13, 2004

(65) Prior Publication Data

US 2005/0082861 A1    Apr. 21, 2005

(30) Foreign Application Priority Data

Oct. 16, 2003  (JP) ............................ 2003-356851
Oct. 16, 2003  (JP) ............................ 2003-356865
Oct. 16, 2003  (JP) ............................ 2003-356883

(51) Int. Cl.
B60R 7/04        (2006.01)
(52) U.S. Cl. ................................. 296/24.34
(58) Field of Classification Search ............ 296/24.34, 296/24.44, 24.46, 37.1, 37.5, 37.8, 37.9, 296/37.14, 24.3; 224/400, 275, 281, 282, 224/495, 496, 497, 498, 499, 502; 220/500, 220/200
See application file for complete search history.

(56) References Cited

U.S. PATENT DOCUMENTS

| | | | |
|---|---|---|---|
| 698,558 A * | 4/1902 | Rosenbaum ................ 190/111 |
| 3,022,107 A * | 2/1962 | Daniels ...................... 296/37.8 |
| 3,177,033 A * | 4/1965 | Daniels ...................... 296/37.8 |
| 4,653,798 A * | 3/1987 | White et al. ................ 296/97.5 |
| 4,934,750 A * | 6/1990 | Eichler et al. ............. 296/37.8 |
| 4,986,589 A * | 1/1991 | McNew ...................... 296/37.8 |
| 5,102,181 A * | 4/1992 | Pinkney ................... 296/37.12 |
| 5,106,143 A * | 4/1992 | Soeters ...................... 296/37.8 |
| 5,301,994 A * | 4/1994 | Wilson ...................... 296/97.2 |
| 5,441,325 A * | 8/1995 | Toth et al. ................. 296/97.2 |
| RE35,622 E * | 10/1997 | Wilson ...................... 296/97.2 |
| 5,813,717 A * | 9/1998 | Wilson ...................... 296/97.5 |
| 5,884,799 A * | 3/1999 | Korber et al. .............. 220/348 |
| 6,045,173 A * | 4/2000 | Tiesler et al. ............... 296/37.8 |
| 6,168,059 B1 * | 1/2001 | Salenbauch et al. ........ 224/539 |
| 6,478,204 B1 * | 11/2002 | Lange et al. ................ 224/539 |
| 6,499,785 B1 * | 12/2002 | Eguchi ...................... 296/37.8 |
| 6,655,561 B1 * | 12/2003 | Panhelleux et al. ......... 224/275 |

FOREIGN PATENT DOCUMENTS

JP       A 07-315097       12/1995

* cited by examiner

*Primary Examiner*—H. Gutman
(74) *Attorney, Agent, or Firm*—Oliff & Berridge PLC

(57) ABSTRACT

A center console which is provided at a walk-through between right and left vehicle seats, and is held to be parallel to a horizontal surface in use and is rotatable so as to be vertical to the horizontal surface when not in use, has: a storing part having an opening at an upper portion; a front cover part for closably covering a front side of the opening; a rear cover part for closably covering a rear side of the opening; a first projecting part projecting upward from an rear end of the front cover part; and a second projecting part projecting upward from an front-end of the rear cover part.

9 Claims, 15 Drawing Sheets

FIG.3
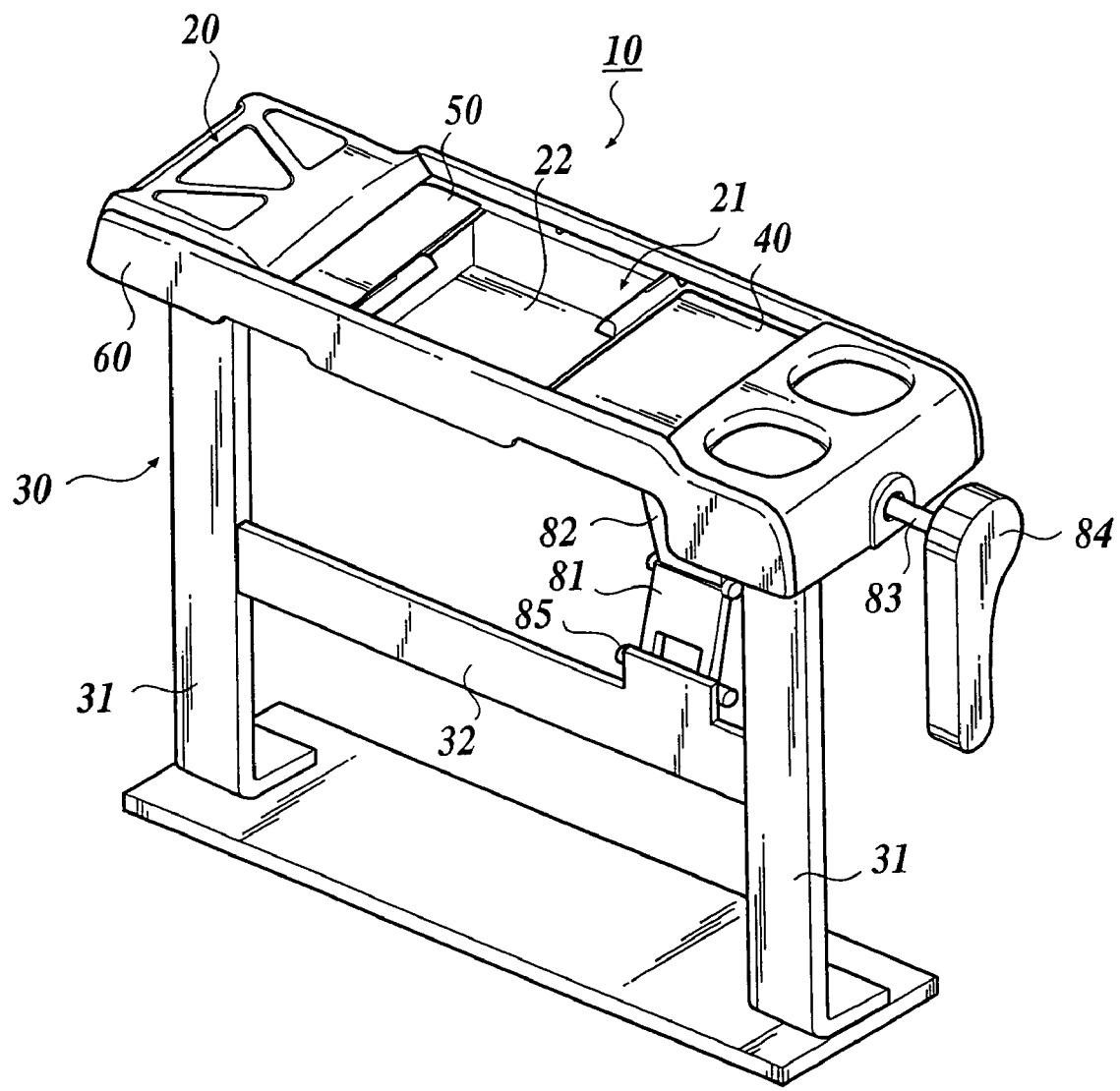
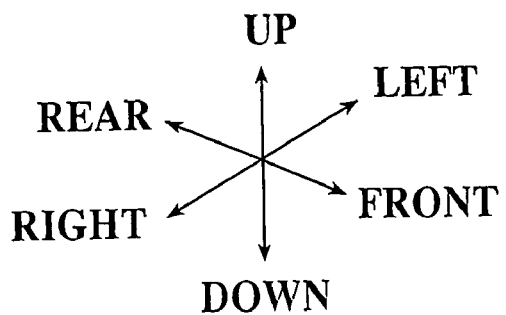

FIG.5
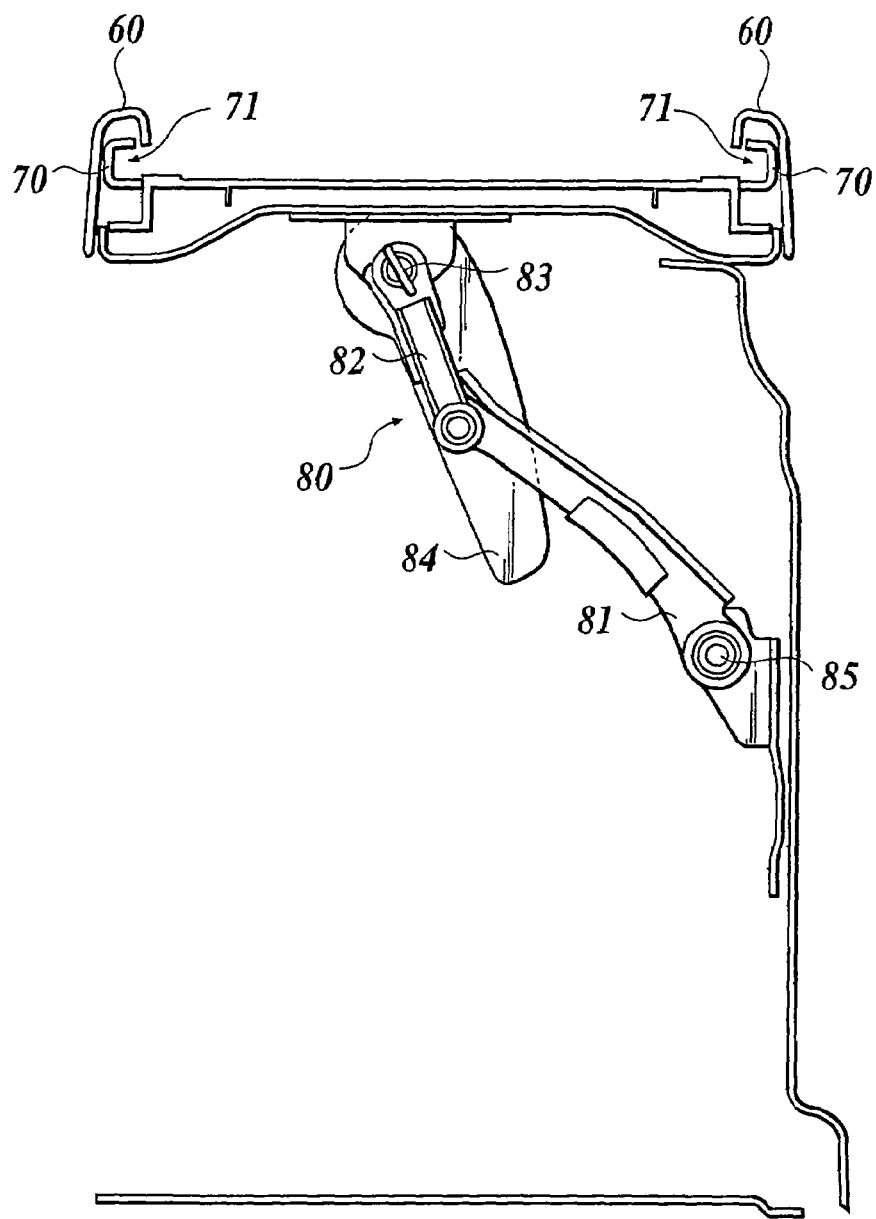
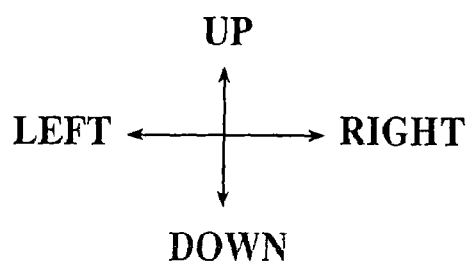

FIG.7
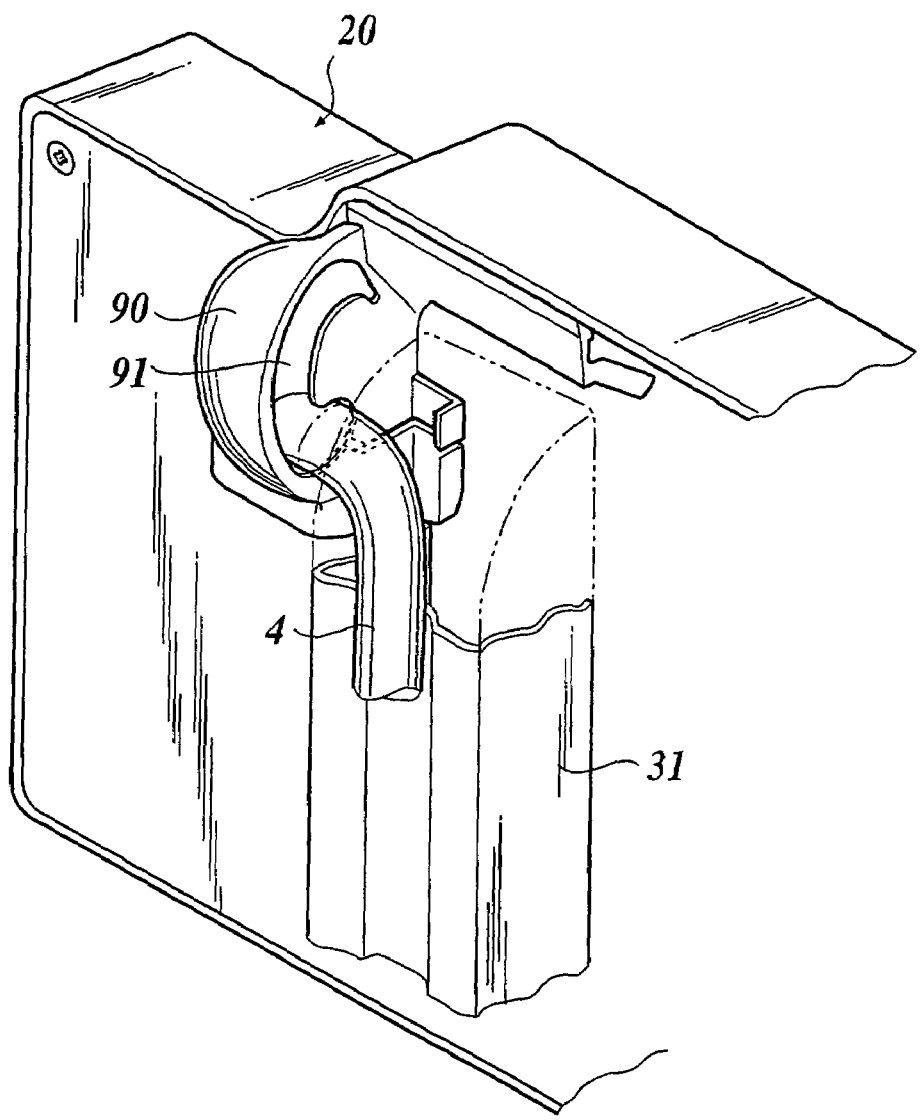
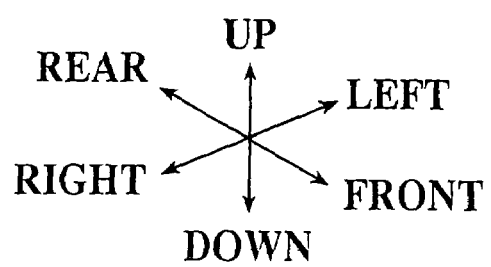

FIG.10
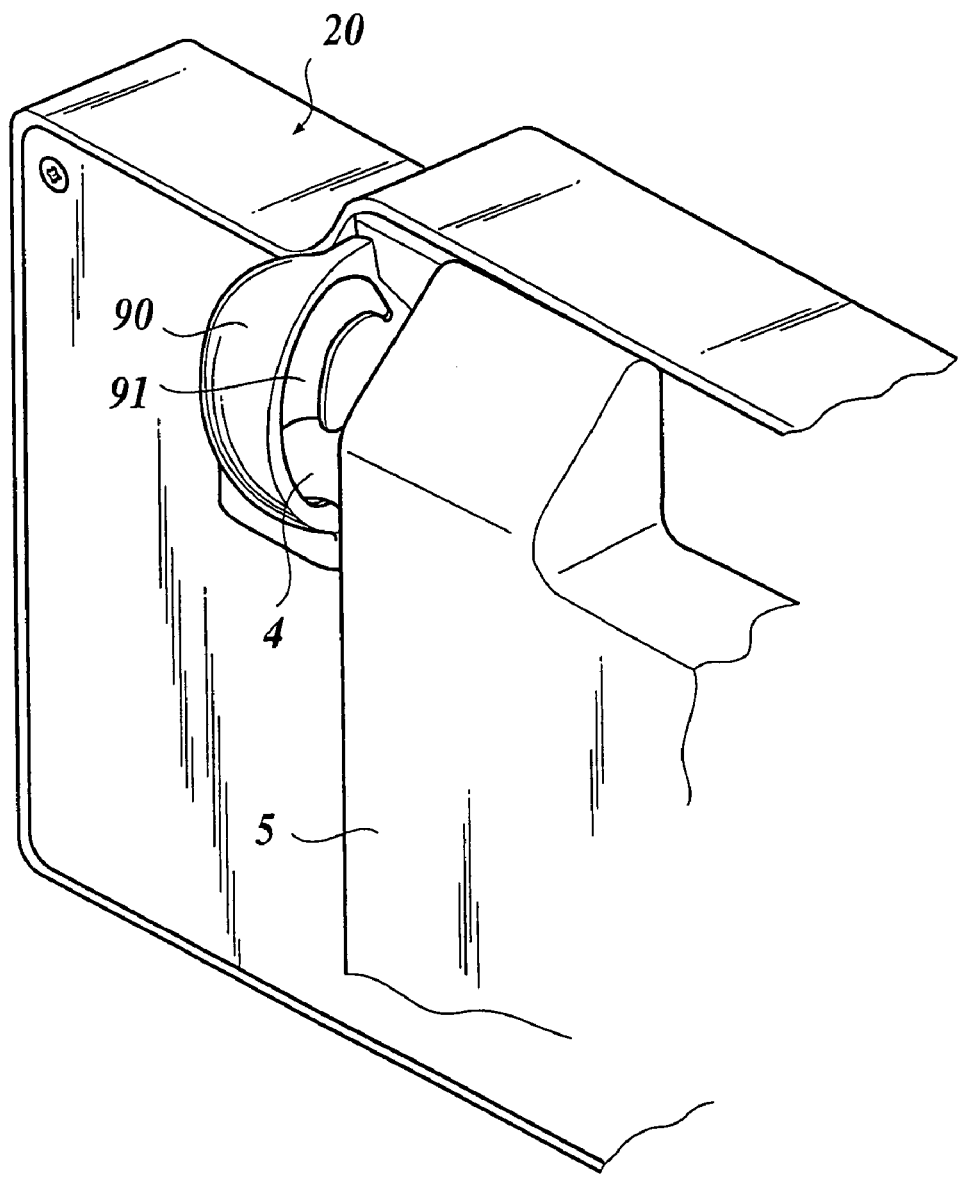
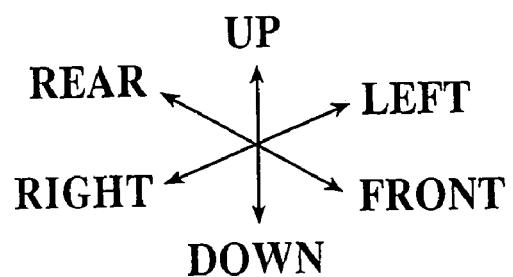

FIG.15 [RELATED ART]
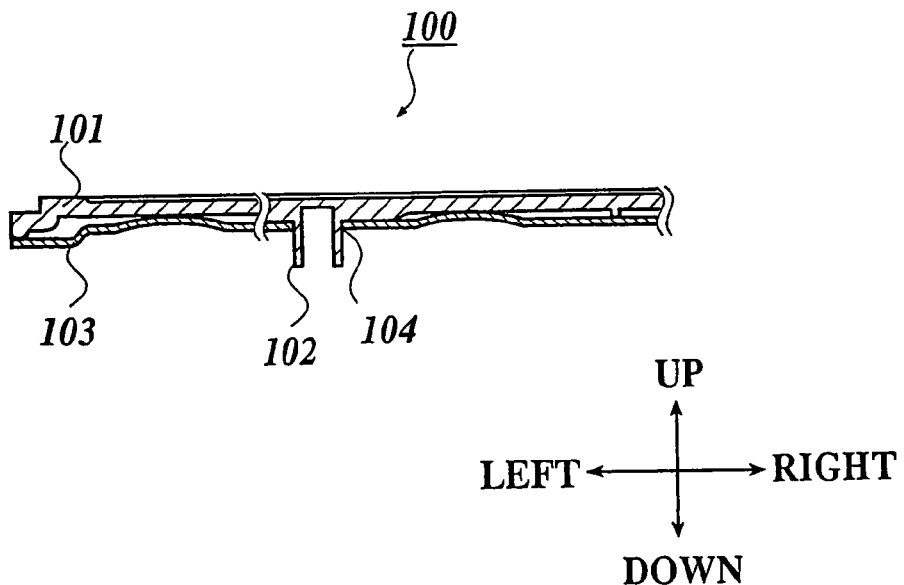
FIG.16 [RELATED ART]
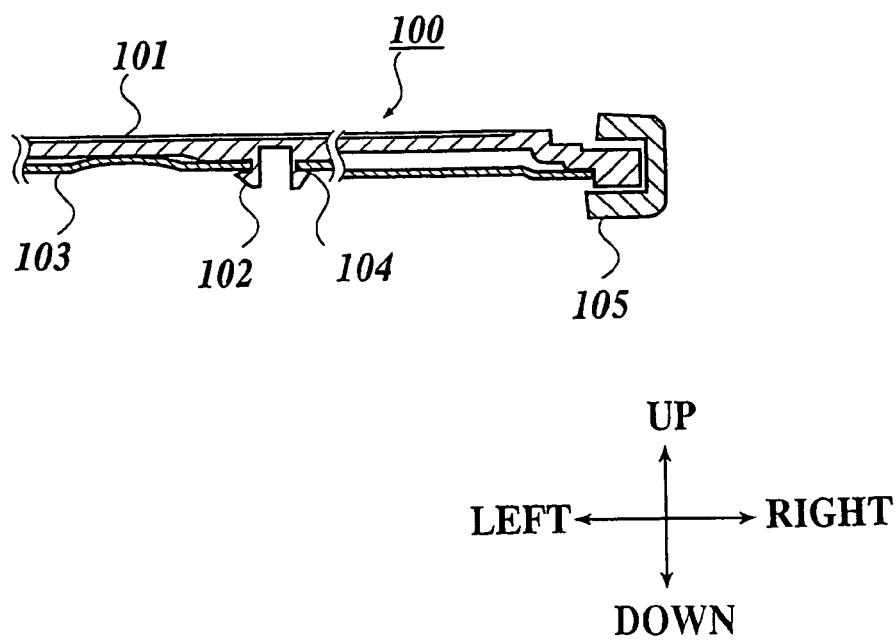

CENTER CONSOLE

BACKGROUND OF THE INVENTION

1. Field of the Invention

The present invention relates to a center console, particularly to a center console which permits a walk-through by folding and storing it when not in use.

2. Description of the Related Art

Recently, considering comfort and convenience in a vehicle, a walk-through to a rear seat is realized by configuring a center console which is attached between a driver seat and a passenger seat to be detachable or foldable.

For example, a folding center console which is held to be parallel to a horizontal surface in use and is rotated to be perpendicular to the horizontal surface to be stored when not in use has been known (For example, refer to JP-Tokukai-hei-7-315097A).

When providing a storing part for storing small articles in the folding center console, a cover (closing cover) for openably/closably covering an upper opening of the storing part needs to be provided to prevent the small articles from dropping from the storing part when the center console is folded.

Preferably, the closing cover has a structure to be easily closable with one hand in view of the convenience of the passenger. However, an earlier developed closing cover, for example, needs to be moved a lot forward or backward to the upper opening of the storing part, so that it has not necessarily provided sufficient convenience.

Also, there is a case to provide a terminal (connector) for power or video input/output on the top panel of the folding center console. However, in an earlier developed center console, a wire harness to be connected to the connector is led to the inside of the top panel through an opening provided in a lower surface of the top panel, so that a rear surface of the top panel is exposed to a passenger in a state that the top panel is stored. Thus, there is a problem in appearance, or shear stress may act on the wire harness from the opening in the rear surface of the top panel by the rotation of the top panel, thereby damaging the wire harness.

Further, FIGS. 15 and 16 are sectional views showing a configuration of a closing cover 100 of an earlier developed technique. As shown in FIG. 15, a plurality of cylindrical protrusions 102 is provided on the rear surface of a decorative plate 101 made of resin, and in the state where each protrusion 102 penetrates through a through hole 104 provided in a reinforcing plate 103 made of steel plate, heat is applied to the lower end of each protrusion 102 to melt it, thereby joining the decorative plate 101 to the reinforcing plate 103 as shown in FIG. 16. The closing cover 100 is sandwiched and held from up and down direction by rail members 105 having a U shape in section disposed at both right and left edges of the closing cover 100, so that the closing cover 100 is supported slidably in back and forth direction.

However, such structure of the earlier developed closing cover requires welding equipment, so that problems would be raised such as increase of manufacturing cost or increase of manpower for welding operation.

SUMMARY OF THE INVENTION

The present invention has been developed in view of the above described problems, and an object of the present invention to provide a center console in which an opening of a storing part can be easily opened or closed.

Another object of the present invention is to provide a center console in which exposure of a wire harness and shear stress acting on the wire harness can be suppressed.

Another object of the present invention is to provide a center console in which manufacturing cost can be suppressed and workability of manufacturing operation can be improved.

In accordance with a first aspect of the present invention, the center console which is provided at a walk-through between right and left vehicle seats, and is held to be parallel to a horizontal surface in use and is rotatable so as to be vertical to the horizontal surface when not in use, comprises:

a storing part having an opening at an upper portion;

a front cover part for closably covering a front side of the opening;

a rear cover part for closably covering a rear side of the opening;

a first projecting part projecting upward from an rear end of the front cover part; and a second projecting part projecting upward from an front end of the rear cover part.

According to the first aspect of the invention, the first and second projecting parts come close with each other in the state that the opening is closed. Accordingly, for example, when a passenger touches the first and second projecting parts with a thumb and an index finger, respectively, and twists the thumb and the index finger, the front closing cover part moves forward and the rear closing cover part moves backward, thereby the opening of the storing part opens. When the passenger, for example, twists the thumb and the index finger in the opposite direction in the state of touching the first projecting part and the second projecting portion with the thumb and the index finger, respectively, the front closing cover part moves backward and the rear closing cover part moves forward, thereby the opening is closed. Thus, the passenger can open or close the opening of the storing part with one hand easily, so that the convenience of the center console can be improved.

Accordingly, the opening of the storing part can be easily opened or closed.

Preferably, the center console further comprises:

a first extending portion extending backward from a rear end of the front cover part; and a second extending portion extending forward from a front end of the rear cover part, wherein the first projecting part is provided at the first extending portion and the second projecting part is provided at the second extending portion, and the first projecting part and the second projecting part continue in right and left direction in a state where the opening is closed.

Accordingly, the first and second projecting parts continue in the state that the opening is closed. Thus, the effect similar to the above described one can be obtained and also, the appearance of the center console can be improved.

In accordance with a second aspect of the present invention, the center console which is provided at a walk-through between right and left vehicle seats, and is held to be parallel to a horizontal surface in use and is rotatable so as to be vertical to the horizontal surface when not in use, comprises:

a top plate having a space inside thereof;

a supporting member to support the top plate to be rotatable;

a wire harness which passes through an opening provided in a rear surface of the top plate to be led to the space and is connected to a connector attached to the top plate in the space; and a cover made of synthetic resin which covers a surrounding of the opening and has a notch along a rotation direction of the top plate, wherein the wire harness moves in the notch when the top plate rotates.

According to the second aspect of the invention, the center console comprises the cover made of synthetic resin which covers the surrounding of the opening and has the notch along the rotation direction of the top plate, and the wire harness is inserted into the notch, so that the wire harness moves in the notch when the top plate rotates. Thus, shear stress does not act on the wire harness from the rear surface of the top plate, so that damage to the wire harness can be prevented. Moreover, since the wire harness can be shielded from the passenger by the shield, the appearance of the center console can be improved.

Accordingly, the center console in which exposure of the wire harness and shear stress acting on the wire harness can be suppressed can be obtained.

In accordance with a third aspect of the present invention, the center console which is provided at a walk-through between right and left vehicle seats, and is held to be parallel to a horizontal surface in use and is rotatable so as to be vertical to the horizontal surface when not in use, comprises:

a storing part having an opening at an upper portion;

a cover comprising a decorative plate and a reinforcing plate attached to a rear surface of the decorative plate for closably covering the opening;

a pair of right and left rail members to support the cover slidably in back and forth direction by sandwiching and holding both right and left edges of the cover from up and down direction; and a pair of right and left frame bodies for supporting the rail members, wherein the cover comprises a fixing member which slidably moves on a surface of the rail members in a state of sandwiching and holding both right and left edges of the decorative plate and the reinforcing plate which are vertically overlapped from up and down direction.

According to the third aspect of the invention, the center console comprises the fixing members which slide on the surface of the rail members in a state where the both right and left edges of the vertically overlapped decorative plate and reinforcing plate are sandwiched and held from up and down direction. Accordingly, there is no need to provide an welding equipment for welding a protrusion provided on the rear surface of the decorative plate such as in the earlier developed closing cover, thereby suppressing the manufacturing cost and manpower of manufacturing operations. In the earlier developed center console, the closing cover is required to separately provide a member at both right and left edges of the closing cover to improve slidability of the closing cover. However, in the center console shown in this embodiment, the fixing member functions not only as a member for fixing the decorative plate and the reinforcing plate but as a member for improving slidability of the closing cover parts, thereby enabling to reduce the number of components of the center console.

Accordingly, manufacturing cost of the center console can be suppressed and workability of manufacturing operation can be improved.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein;

FIG. 3 is a perspective view showing a main portion of a structure of the center console;

FIG. 5 is a back view showing a main portion of a structure of the center console;

FIG. 7 is a perspective view showing a main portion of a structure of a rear surface of a top panel;

FIG. 10 is a perspective view showing a main portion of a structure of the rear surface of the top panel;

FIG. 15 is a sectional view showing a structure of a closing cover of an earlier developed technique; and FIG. 16 is a sectional view showing a structure of a closing cover of an earlier developed technique.

DETAILED DESCRIPTION OF THE PREFERRED EMBODIMENTS

Figure 1:
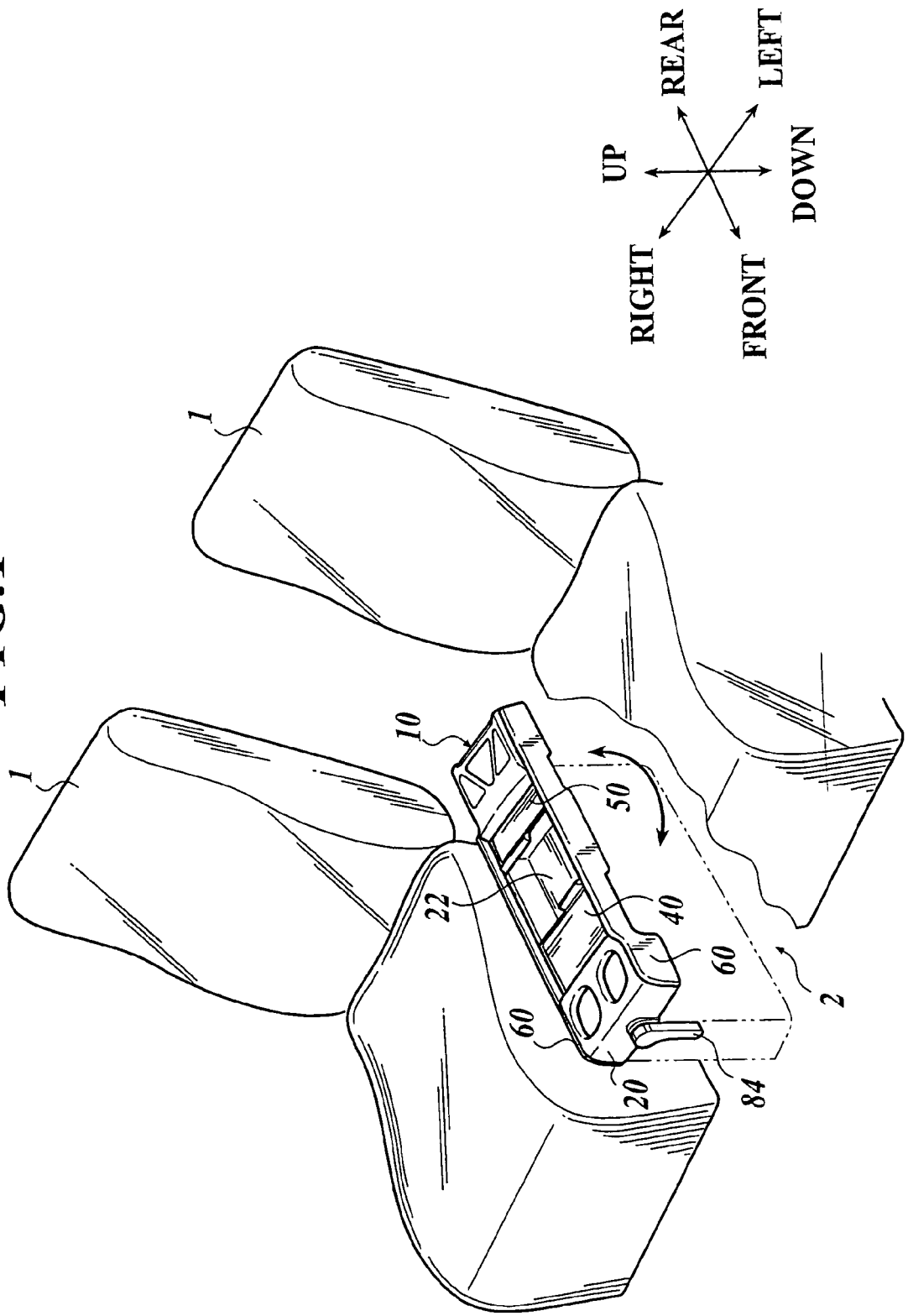
FIG. 1 is a perspective view showing a main portion of a center console in a horizontal state.

The embodiment for embodying the present invention will be explained referring to the drawings below.

Figure 2:
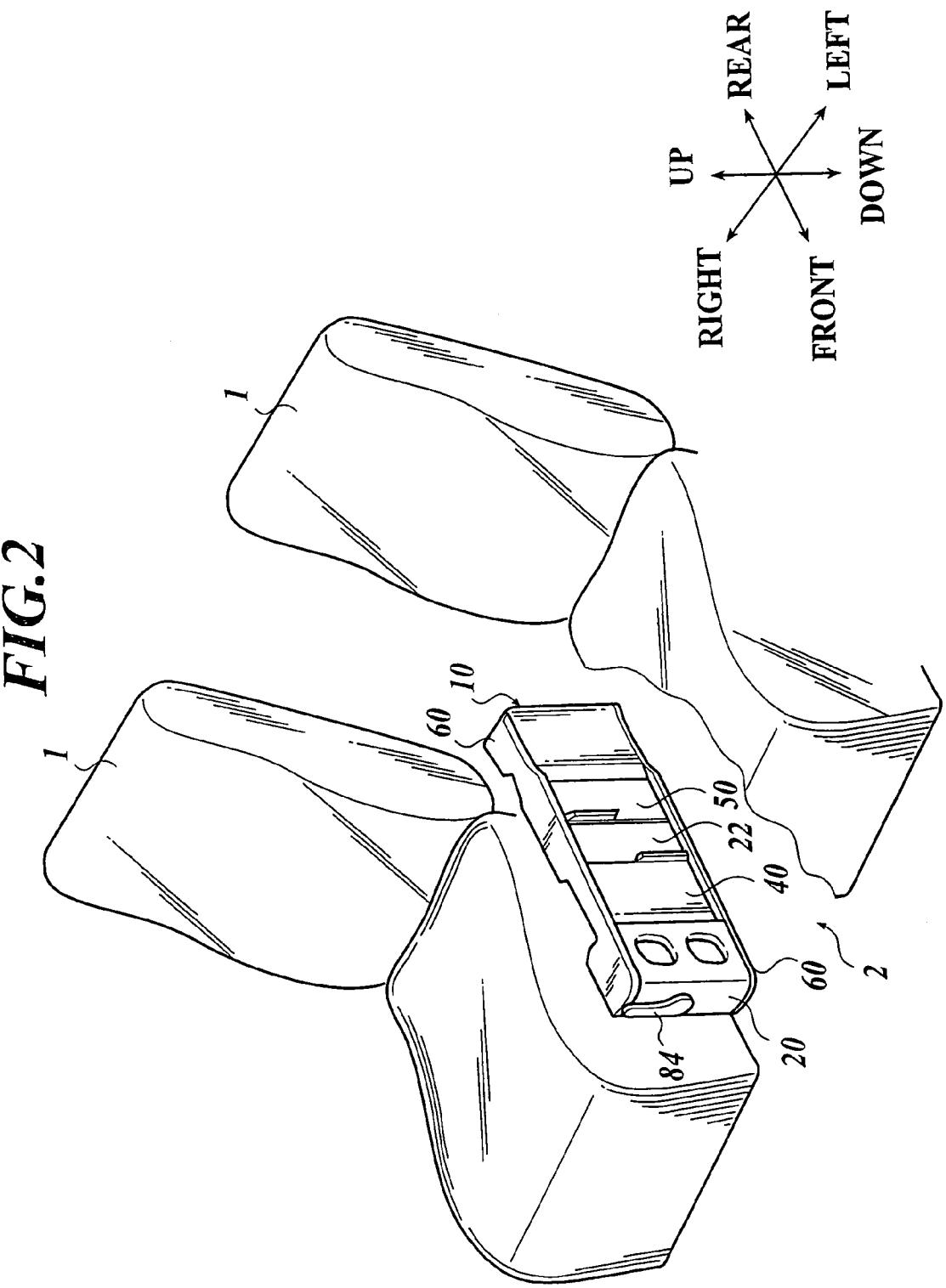
FIG. 2 is a perspective view showing a main portion of the center console in a vertical state.

As shown in FIG. 1, a center console 10 is provided at a walk-through portion 2, that is, between two right and left vehicle seats 1. The center console 10 is held to be parallel to the horizontal surface in use, and is rotatable so as to be vertical to the horizontal surface when not in use as shown in FIG. 2.

Specifically, as shown in FIG. 3, the center console 10 comprises a top plate 20 having a space inside thereof, a supporting member 30 for rotatably supporting the top plate 20 and the like.

The supporting member 30 comprises two front and rear vertical members 31 which are fixed to be vertical to the floor of the vehicle, and a horizontal member 32 which is crossed between the vertical members 31.

A storing part 22 having an opening 21 at the top portion thereof is formed on the top plate 20. The front side of the opening 21 is openably/closably covered by a front closing cover part 40, and the rear side of the opening 21 is openably/closably covered by a rear closing cover part 50.

Figure 4:
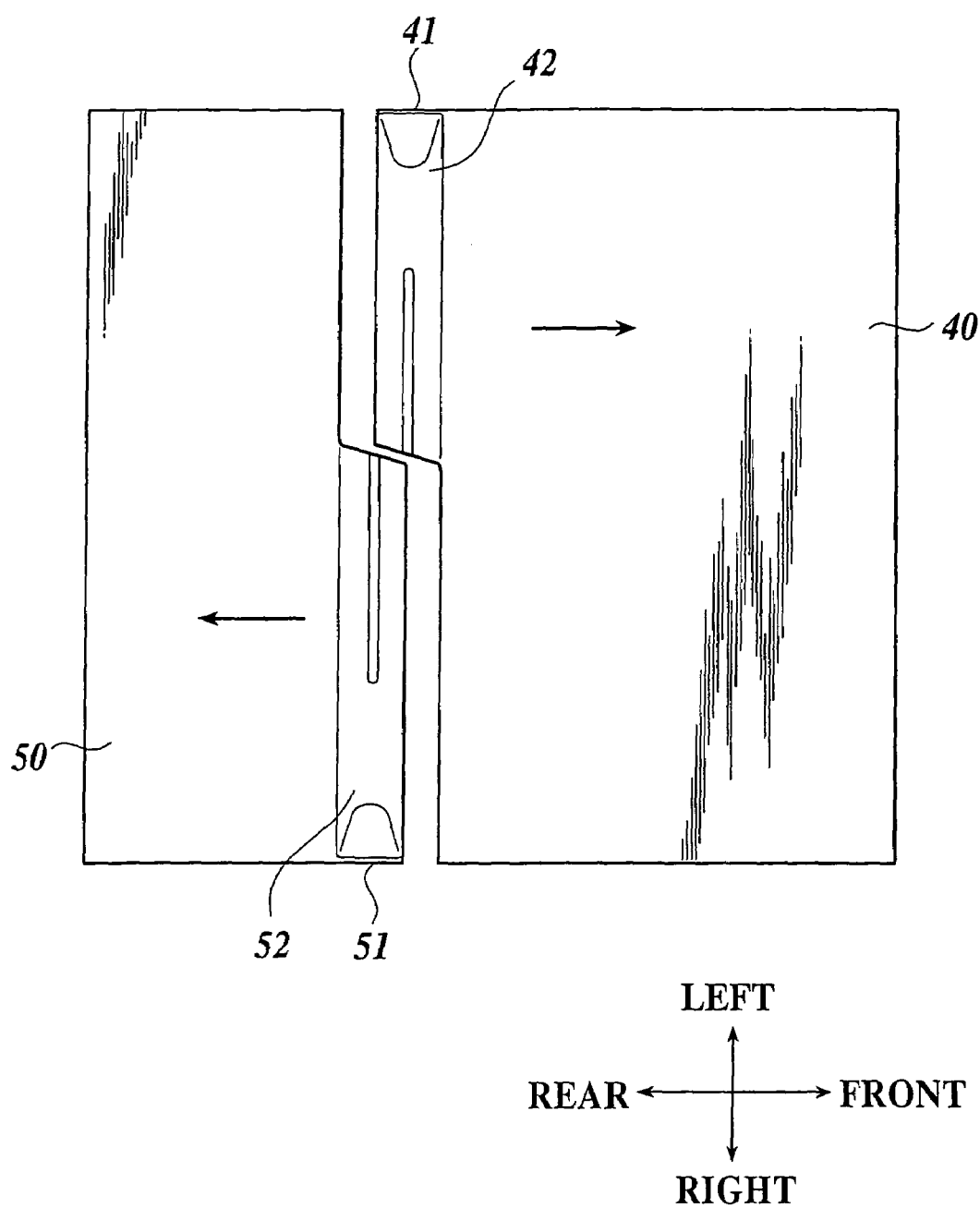
FIG. 4 is a plan view showing a structure of a closing cover.

As shown in FIG. 4, a first extending portion 41 extending backward from the right side of the rear end of the front closing cover part 40 and a second extending portion 51 extending forward from the left side of the front end of the rear closing cover part 50 are formed. Further, a first projecting part 42 projecting upward from the surface of the first extending portion 41 and a second projecting part 52 extending upward from the surface of second extending portion 51 are formed. The first and second projecting parts 42 and 52 continue in right and left direction in a state where the opening 21 of the storing part 22 is closed.

As shown in FIG. 5, there are frame bodies 60 as a cover and rail members 70 for supporting the closing cover parts 40 and 50 slidably in back and forth direction attached to the right and left sides of the top plate 20. The rail member 70 is a member having a U shape in section, and is fixed to the interior side of the frame body 60. Both right and left edges of the closing cover parts 40 and 50 are engaged in the inside of the openings 71 of the rail members 70, so that the closing cover parts 40 and 50 are sandwiched and held from up and down direction at right and left edges thereof. The configuration is such that the closing cover parts 40 and 50 are slidable in back and forth direction. In FIG. 5, the closing cover parts 40 and 50 are omitted.

Figure 6:
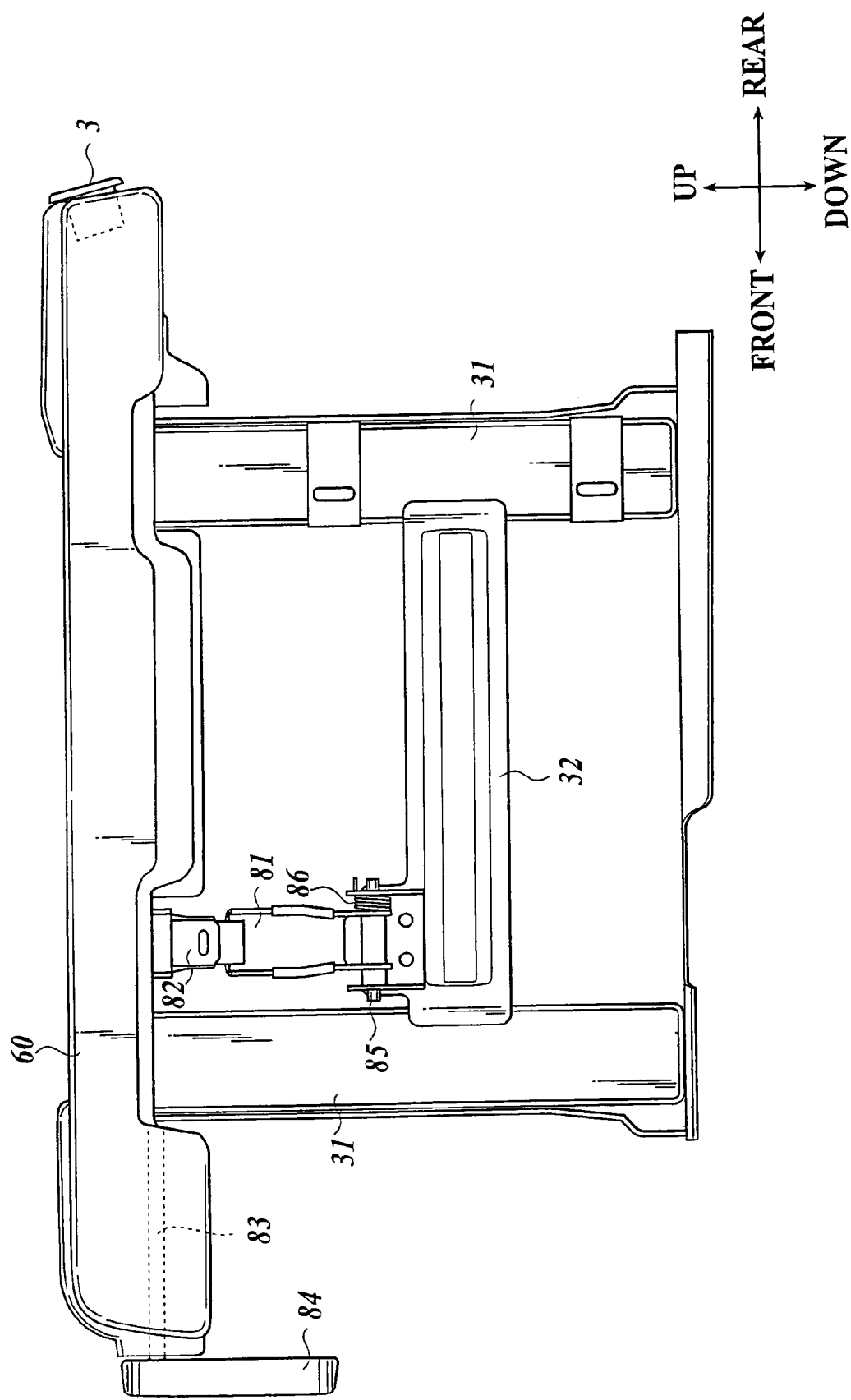
FIG. 6 is a side view showing a main portion of a structure of the center console.

A rotation mechanism 80 for rotating the center console 10 from the horizontal state to the vertical state is same as that of a general center console in an earlier developed technique, so that the detailed explanation thereof is omitted. The rotation mechanism 80 is schematically configured by comprising a first arm 81, a second arm 82, a connecting bar 83, a lever 84 and the like as shown in FIGS. 5 and 6.

The first arm 81 is connected to a rotary shaft 85 which is fixed to the horizontal member 32 at the lower end thereof, and to a lower end of the second arm 82 at the upper end thereof. A spring 86 is attached to the rotary shaft 85, and the first arm 81 is rotatable in a state of being biased clockwise in FIG. 5 by the spring 86 around the rotary shaft 85 as a center.

The second arm 82 is connected to the upper end of the first arm 81 at the lower end thereof as described above, and is fixed to the connecting bar 83 which extends in back and forth direction at the upper end thereof. The connecting bar 83 is supported by a portion of the top plate 20 to be rotatable around an axis thereof, and a lever 84 is attached to the front end of the connecting bar 83.

As shown in FIG. 5, the connection part of the first and second arms 81 and 82 is at a position which is lower than the line connecting the lower end of the first arm 81 and the upper end of the second arm 82 in a state that the center console 10 is held to be parallel to the horizontal surface, so that the load from the top plate 20 is transmitted toward the floor through the vertical member 31.

When the lever 84 is rotated counterclockwise in FIG. 5 from this state, the torque from the lever 84 is transmitted to the second arm 82 through the connecting bar 83, and the second arm 82 rotates counterclockwise around the upper end thereof as a center. Thereby, the connection part of the first and second arms 81 and 82 moves to the position which is higher than the line connecting the lower end of the first arm 81 and the upper end of the second arm 82. Then, the first arm 81 which is biased by the spring 86 rotates clockwise around the rotary shaft 85 as a center, so that the center console 10 rotates to the position vertical to the horizontal surface and is stored to the side surface of the vehicle seat 1.

As described above, in the center console 10 in this embodiment, the closing cover closably covering the opening 21 of the storing part 22 is divided into the front closing cover part 40 and the rear closing cover part 50, and the center console 10 comprises the first extending portion 41 extending backward front the rear end of the front closing cover part 40 and the second extending portion 51 extending forward from the front end of the rear closing cover part 50. Further, the center console 10 comprises the first projecting part 42 projecting upward from the surface of the first extending portion 41 and the second projecting part 52 projecting upward from the surface of the second extending portion 51.

Thereby, the first and second projecting parts 42 and 52 continue in right and left direction in the state where the opening 21 of the storing part 22 is closed. Accordingly, for example, when a passenger touches the first and second projecting parts 42 and 52 with a thumb and an index finger, respectively, and twists the thumb and the index finger, the front closing cover part 40 moves forward and the rear closing cover part 50 moves backward, thereby the opening 21 of the storing part 22 opens. From this state, when the passenger, for example, twists the thumb and the index finger in the opposite direction in the state of touching the first projecting part 42 and the second projecting portion 52 with the thumb and the index finger, respectively, the front closing cover part 40 moves backward and the rear closing cover part 50 moves forward, thereby the opening 21 is closed. Thus, the passenger can open or close the opening 21 of the storing part 22 with one hand easily, so that the convenience of the center console 10 can be improved.

Accordingly, the opening of the storing part can be easily opened or closed.

In this embodiment, the first and second extending portions 41 and 51 are provided, which become continuous in right and left direction when the opening 21 is closed, however, it is not limited thereto. The first and second projecting parts 42 and 52 may be provided near the rear end of the front closing cover part 40 and the front end of the rear closing cover part 50, respectively, without providing the first and second extending portions 41 and 51, so that the whole surface of the rear end of the front closing cover part 40 contacts the whole surface of the front end of the rear closing cover part 50 in the state where the opening 21 is closed, enabling to obtain the effect similar to that in this embodiment.

Figure 8:
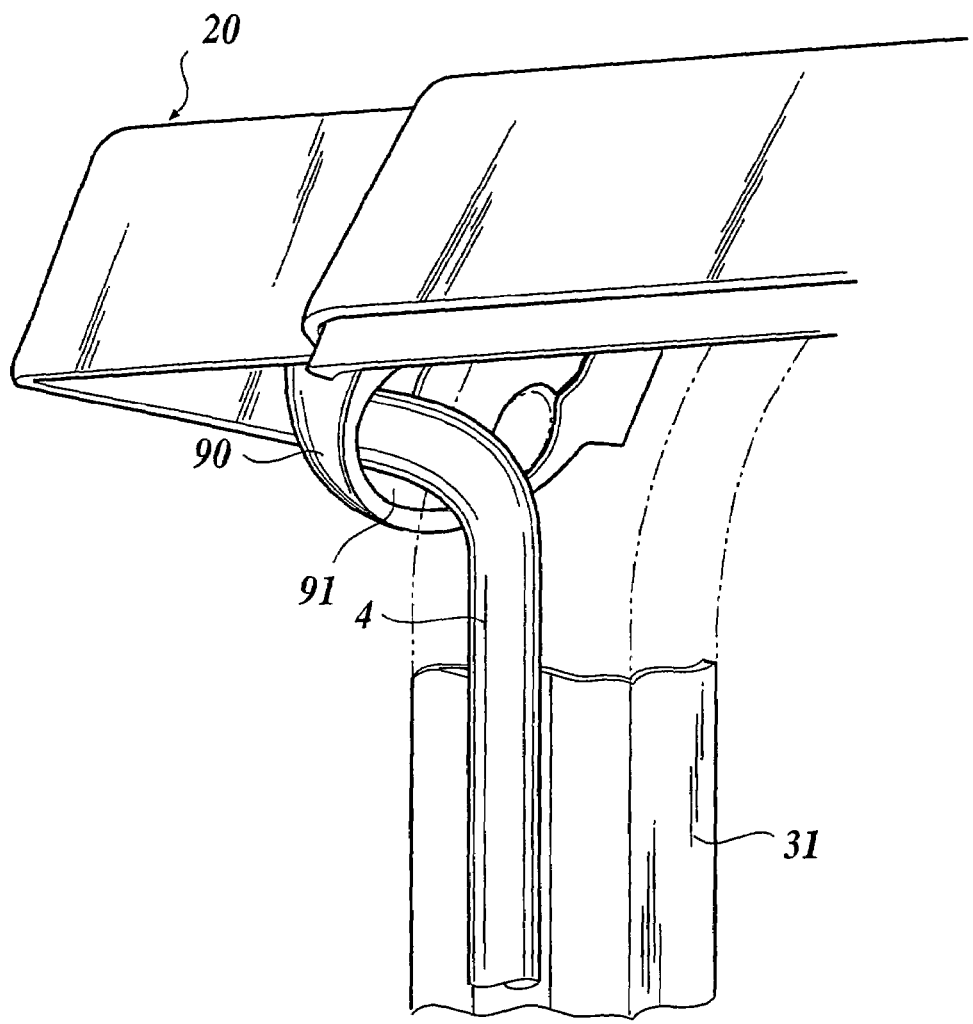
FIG. 8 is a perspective view showing a main portion of a structure of the rear surface of the top panel.

As shown in FIG. 6, there is a connector 3 for power and video input/output attached to the back end of the top panel 20. As shown in FIGS. 7 and 8, the wire harness 4 extends to the inside of the space of the top panel 20 through the side surface of the supporting member 30, and is connected to the connector 3 in the space. FIG. 7 shows a state where the top panel 20 is rotated to be perpendicular to the horizontal surface and is stored, and FIG. 8 shows a state where the top panel 20 is held to be parallel to the horizontal surface.

Figure 9:
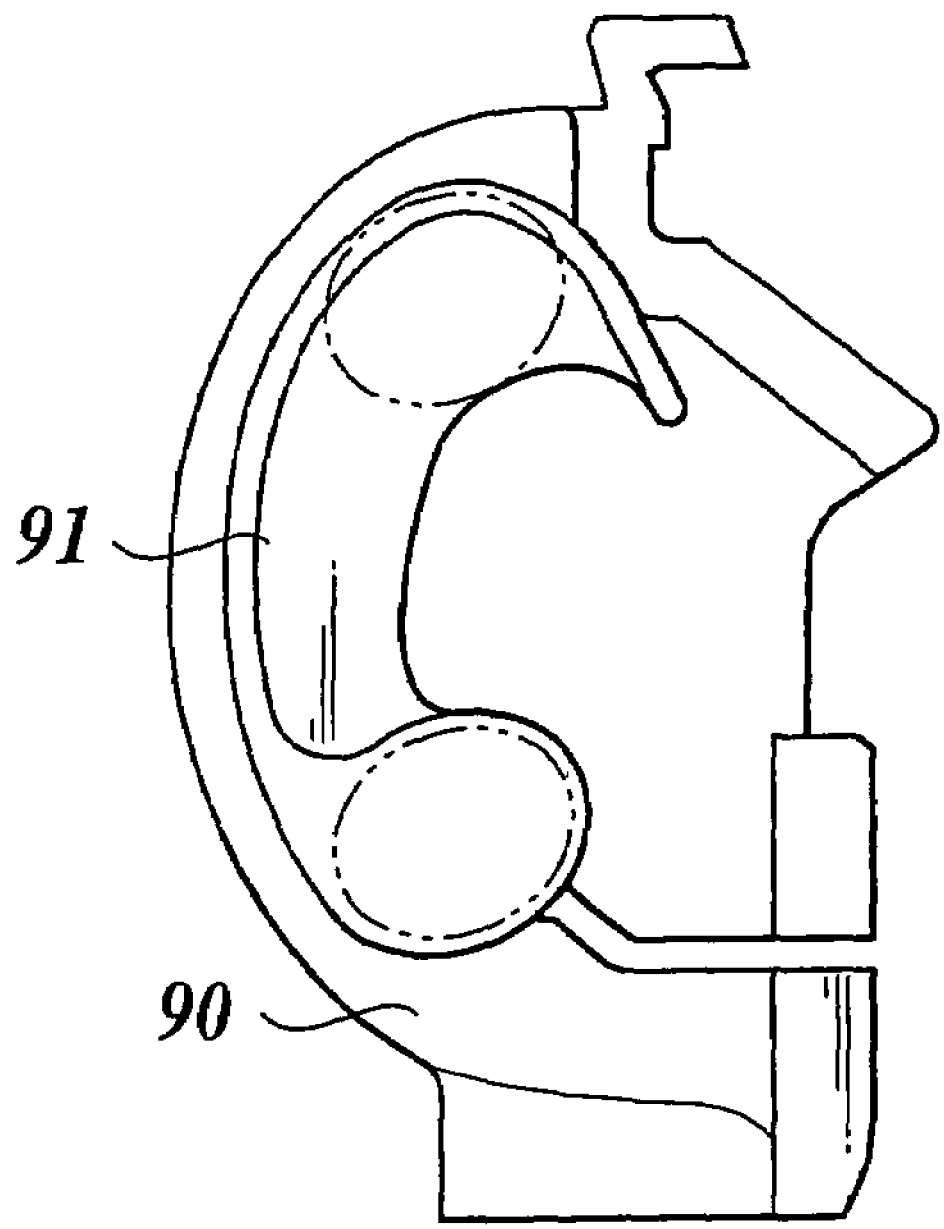
FIG. 9 is a front view showing a structure of a cover.

Specifically, there is provided an opening (not shown) in the rear surface of the top panel 20, and as shown in FIG. 9, a cover 90 covering the surrounding of the opening and comprising a notch 91 which extends along the rotation direction of the top panel 20 is attached. The wire harness 4 is inserted into the notch 91 and extends to the inside of the space of the top panel 20. The cover 90 is, for example, made of synthetic resin such as vinyl chloride, rubber or the like, and has elasticity and plasticity.

Further, as shown in FIG. 10, a shield 5 for covering the supporting member 30 and the surface of the wire harness 4 is attached, thereby shielding the wire harness 4 from the passenger.

With the rotation of the top panel 20 from the vertical state shown in FIG. 7, the cover 90 attached to the rear surface of the top panel 20 starts to rotate at the same time. Since the wire harness 4 is fixed to the side surface of the supporting member 30, the wire harness 4 moves in the notch 91 relative to the cover 90 with the rotation of the cover 90. Thus, the wire harness 4 moves to the other end of the notch 91 as the top panel 20 becomes in the horizontal state as shown in FIG. 8.

As described above, the center console 10 in this embodiment comprises the cover 90 which is made of synthetic resin for covering the surrounding of the opening provided in the rear surface of the top panel 20 and which has the notch 91 extending along the rotation direction of the top panel 20, and the wire harness 4 inserted in the notch 91 moves in the notch 91 with the rotation of the top panel 20. Accordingly, since sheer stress does not act on the wire harness 4 from the rear surface of the top panel 20 with the rotation of the top panel 20, damage to the wire harness 4 can be prevented. Also, since the wire harness 4 can be shielded from the passenger by the cover 90, the appearance of the center console 10 can be improved.

Accordingly, the center console in which exposure of the wire harness and shear stress acting on the wire harness is suppressed can be obtained.

Figure 11:
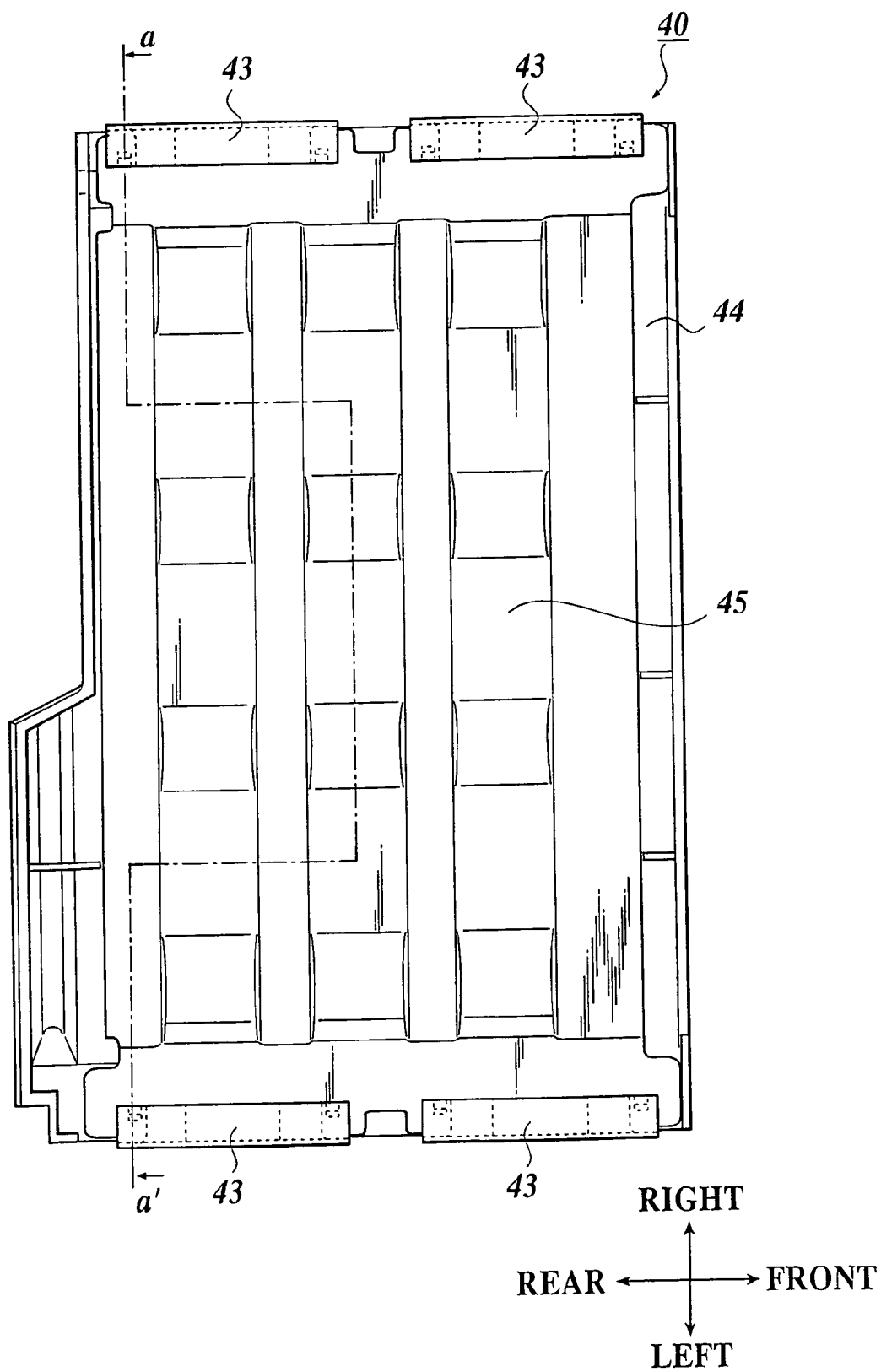
FIG. 11 is a bottom view showing a structure of the closing cover.
Figure 12:
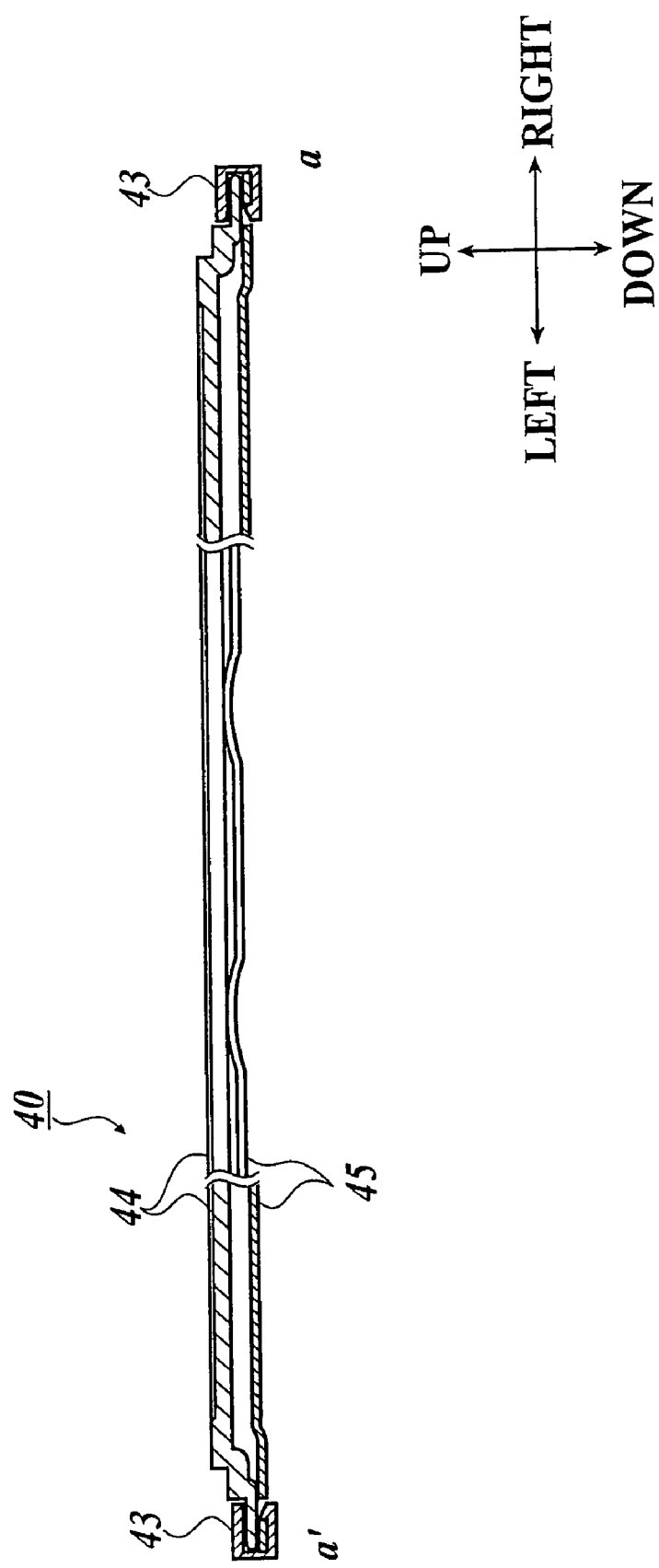
FIG. 12 is a sectional view showing a structure of the closing cover.

FIG. 11 is a view of the front closing cover part 40 as seen from the rear surface, and FIG. 12 is an arrow sectional view of the line a–a' in FIG. 11. The structure of the front and rear closing cover parts 40 and 50 are approximately the same, therefore, only the structure of the front closing cover part 40 will be explained below.

The front closing cover part 40 comprises a decorative plate 44 and a reinforcing plate 45 attached to the rear surface of the decorative plate 44, and the decorative plate 44 and the reinforcing plate 45 which are vertically overlapped are held from up and down direction by a plurality pairs of right and left fixing members 43 at both right and left edges thereof to be unified. The fixing members 43 are engaged at the openings 71 of the rail members 70 provided at right and left of the front closing cover part 40, enabling the fixing members 43 to slidably move back and forth inside the openings 71. Detailed explanations thereof will be made below.

Preferably, the fixing member 43 is formed with, for example, reinforced resin in which glass fiber as reinforcing material is included in polyamide resin or the like. The reinforced resin is a resin which includes inorganic material as reinforcing material to have high strength and stiffness. Examples of the inorganic material include high silicic acid material such as glass, fused silica or the like, ceramic material such as carbon, silicon carbide or the like, metal material such as copper, stainless or the like, composite such as boron/tungsten, boron/carbon or the like formed into a fibrous shape or beads, or the like. Thereby, the strength and slidability of the fixing member 43 can be improved.

Figure 13:
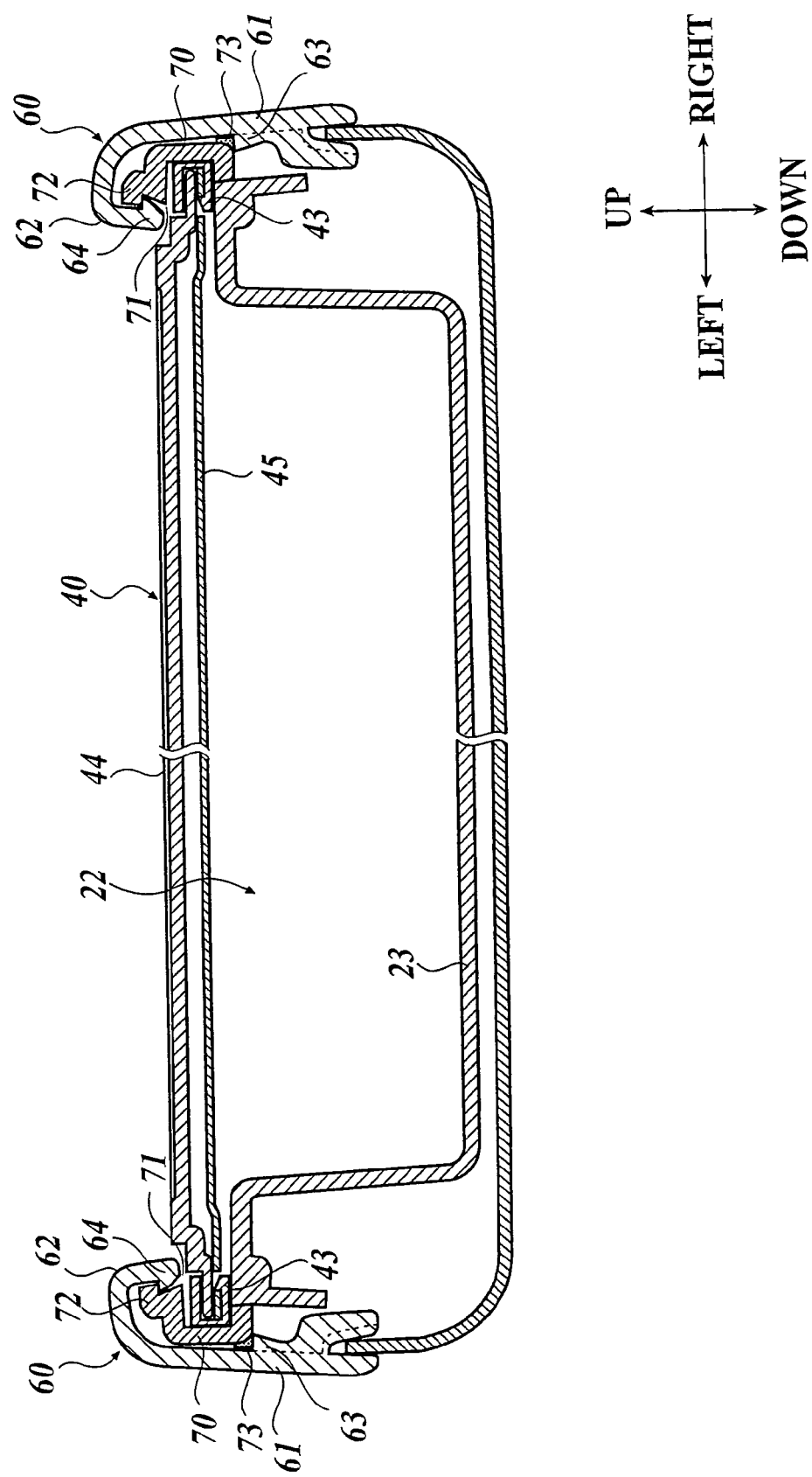
FIG. 13 is a front view showing a structure of a frame body and a rail member.

As shown in FIG. 13, there are the frame bodies 60 as a cover and the rail members 70 for supporting the closing cover parts 40 and 50 slidably in back and forth direction attached to the right and left sides of the top plate 20.

The rail member 70 is a member having a U shape in section, and is fixed in the interior side of the frame body 60. The fixing members 43 attached to both right and left edges of the closing cover parts 40 and 50 are engaged in the inside of the openings 71 of the rail members 70, so that the closing cover parts 40 and 50 are sandwiched and held from up and down direction at right and left edges thereof. The configuration is such that the closing cover parts 40 and 50 are slidable in back and forth direction. The rail member 70 comprises a plurality of upper projecting portions 72 each projecting inwardly from the upper surface thereof, and a plurality of lower projecting portions 73 each projecting outwardly from the lower surface thereof. The upper and lower projecting portions 72 and 73 are provided at predetermined intervals in a longitudinal direction, respectively.

A box-shaped member 23 which is to be a bottom surface and side surfaces of the storing part 22 is attached to the lower portion of the rail members 70.

Each frame body 60 comprises a side surface portion 61 for covering a side surface of the rail member 70, and an extending portion 62 which extends inwardly from the upper end of the side surface portion 61 and a tip end of which is bent downward. A lower engaging piece 63 which engages with the lower projecting portion 73 is provided at the side surface portion 61, and an upper engaging piece 64 which engages with the upper projecting portion 72 is provided at a bending portion of the extending portion 62.

Figure 14:
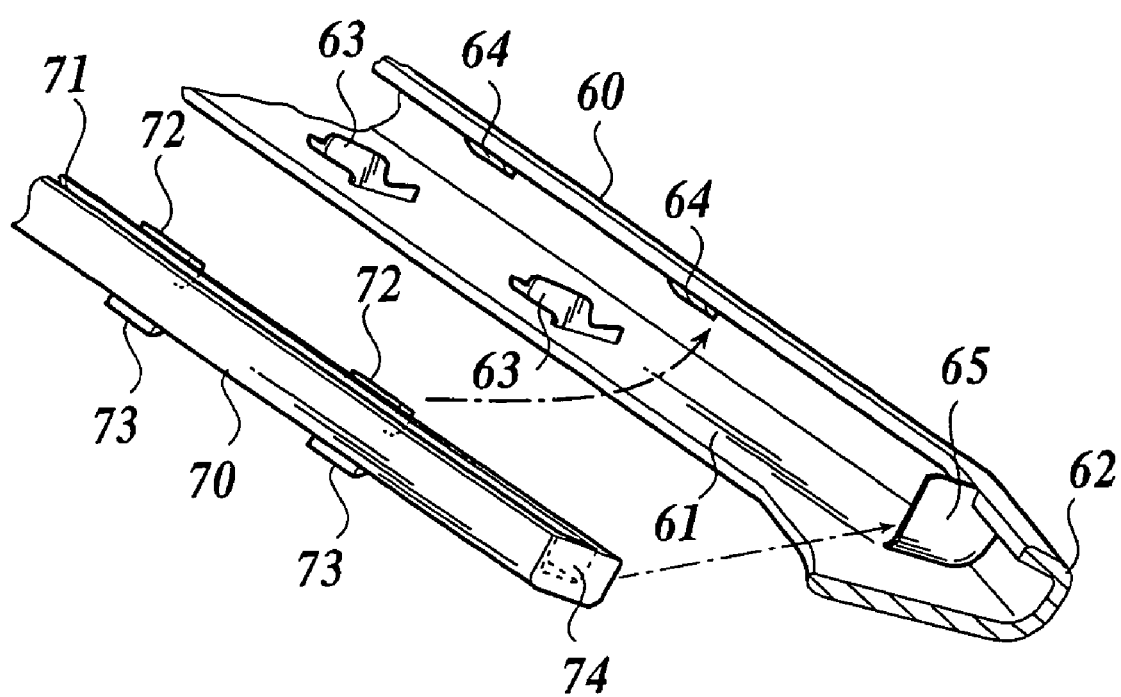
FIG. 14 is a perspective view showing a main portion of a structure of the frame body and the rail member.

As shown in FIG. 14, a plate-like projecting part 65 is formed near the front end of the frame body 60, and a notch 74 is formed near the front end of the rail member 70.

When attaching the rail member 70 to the frame body 60, first, a worker makes the projecting part 65 of the frame body 60 be engaged in the notch 74 of the rail member 70 for positioning the rail member 70 in back and forth direction. Next, the rail member 70 is pushed in the frame body 60 while elastically deforming the extending portion 62 in a state where the upper portion of the rail member 70 contacts the inner surface of the extending portion 62 of the frame body 60, thereby engaging the upper and lower projecting portions 72 and 73 with the upper and lower engaging pieces 64 and 63, respectively. Since the upper end portion of the lower engaging piece 63 is notched, the rail member 70 can be smoothly moved in the frame body 60.

As described above, the center console 10 described in this embodiment comprises the fixing members 43 which slide on the surface of the rail members 70 in a state where the both right and left edges of the vertically overlapped decorative plate 44 and reinforcing plate 45 are sandwiched and held from up and down direction. Accordingly, there is no need to provide an welding equipment for welding a protrusion provided on the rear surface of the decorative plate such as in the earlier developed closing cover, thereby suppressing the manufacturing cost and manpower of manufacturing operations. In the earlier developed center console, the closing cover is required to separately provide a member at both right and left edges of the closing cover to improve slidability of the closing cover. However, in the center console 10 shown in this embodiment, the fixing member 43 functions not only as a member for fixing the decorative plate 44 and the reinforcing plate 45 but as a member for improving slidability of the closing cover parts 40 and 50, thereby enabling to reduce the number of components of the center console 10.

Accordingly, manufacturing cost of the center console can be suppressed and workability of manufacturing operation can be improved.

What is claimed is:

1. A center console which is provided at a walk-through between right and left vehicle seats, and is held to be parallel to a horizontal surface in use and is rotatable so as to be vertical to the horizontal surface when not in use, comprising:

a storing part having an opening at an upper portion;

a front cover part for closably covering a front side of the opening;

a rear cover part for closably covering a rear side of the opening;

a first projecting part projecting upward from an rear end of the front cover part; and a second projecting part projecting upward from an front end of the rear cover part;

a first extending portion extending backward from a rear end of the front cover part; and a second extending portion extending forward from a front end of the rear cover part, wherein the first projecting part is provided at the first extending portion and the second projecting part is provided at the second extending portion, and the first projecting part and the second projecting part continue in right and left direction in a state where the opening is closed.

2. A center console which is provided at a walk-through between right and left vehicle seats, and is held to be parallel to a horizontal surface in use and is rotatable so as to be vertical to the horizontal surface when not in use, comprising:

a top plate having a space inside thereof;

a supporting member to support the top plate to be rotatable;

a wire harness which passes through an opening provided in a rear surface of the top plate to be led to the space and is connected to a connector attached to the top plate in the space; and a cover made of synthetic resin which covers a surrounding of the opening and has a notch along a rotation direction of the top plate, wherein the wire harness moves in the notch when the top plate rotates.

3. The center console as claimed in claim 2, further comprising a shield for covering a surface of the supporting member and the wire harness.

4. A center console which is provided at a walk-through between right and left vehicle seats, and is held to be parallel to a horizontal surface in use and is rotatable so as to be vertical to the horizontal surface when not in use, comprising:

a storing part having an opening at an upper portion;

a cover comprising a decorative plate and a reinforcing plate attached to a rear surface of the decorative plate for closably covering the opening;

a pair of right and left rail members to support the cover slidably in back and forth direction by sandwiching and holding both right and left edges of the cover from up and down direction; and a pair of right and left frame bodies for supporting the rail members, wherein the cover comprises a fixing member which slidably moves on a surface of the rail members in a state of sandwiching and holding both right and left edges of the decorative plate and the reinforcing plate which are vertically overlapped from up and down direction.

5. The center console as claimed in claim 4, wherein the cover comprises a front cover part for closably covering a front side of the opening and a rear cover part for closably covering a rear side of the opening.

6. The center console as claimed in claim 4, wherein the fixing member is formed with a reinforced resin.

7. The center console as claimed in claim 5, wherein the fixing member is formed with a reinforced resin.

8. A center console which is provided at a walk-through between right and left vehicle seats, and is held to be parallel to a horizontal surface in use and is rotatable so as to be vertical to the horizontal surface when not in use, comprising:

a top plate having a space inside thereof;

a supporting member to support the top plate to be rotatable;

a wire harness which passes through an opening provided in a rear surface of the top plate to be led to the space and is connected to a connector attached to the top plate in the space; and a cover which covers a surrounding of the opening and has a notch along a rotation direction of the top plate, wherein the wire harness moves in the notch when the top plate rotates.

9. A center console which is provided at a walk-through between right and left vehicle seats, and is held to be parallel to a horizontal surface in use and is rotatable so as to be vertical to the horizontal surface when not in use, comprising:

a storing part having an opening at an upper portion;

a cover comprising a decorative plate and a reinforcing plate attached to a rear surface of the decorative plate for closably covering the opening;

a rail member to support the cover to be slidable by sandwiching and holding both right and left edges of the cover; and a frame body for supporting the rail member, wherein the cover comprises a fixing member which slidably moves on a surface of the rail member in a state of sandwiching and holding both right and left edges of the decorative plate and the reinforcing plate which are vertically overlapped.

* * * * *